United States Patent [19]

Tsubuko et al.

[11] 3,992,342

[45] Nov. 16, 1976

[54] NON-AQUEOUS DISPERSION AND PROCESS OF PREPARING SAME

[75] Inventors: Kazuo Tsubuko, Yokohama; Yukihiko Nakagawa, Chiba; Kenichi Matsubayashi, Yokohama; Yoshihiko Kido, Numazu, all of Japan

[73] Assignee: Ricoh Co., Ltd., Tokyo, Japan

[22] Filed: July 10, 1975

[21] Appl. No.: 594,805

[52] U.S. Cl. ............................... 260/28.5 A; 260/28.5 R
[51] Int. Cl.² .......................................... C08L 91/00
[58] Field of Search ............... 260/28.5 R, 28.5 A, 260/897 B, 885

[56] References Cited
UNITED STATES PATENTS 3,665,053   5/1972   Mizutani et al. ............ 260/897 B X

*Primary Examiner*—Lewis T. Jacobs
*Attorney, Agent, or Firm*—Woodhams, Blanchard and Flynn

[57] ABSTRACT

A non-aqueous dispersion containing a graft copolymer and at least one substance selected from the group consisting of polyethylene, polyethylene wax and paraffin wax in a liquid carrier (an organic solvent) having a high resistivity and a low dielectric constant and a process of preparing said non-aqueous dispersion.

4 Claims, No Drawings

NON-AQUEOUS DISPERSION AND PROCESS OF PREPARING SAME

BACKGROUND OF THE INVENTION:

It is well known to provide non-aqueous dispersions containing a graft copolymer in a liquid carrier having a high resistivity and a low dielectric constant such as an aliphatic hydrocarbon. We found that the dispersability and the stability of the non-aqueous dispersions as above can be improved by adding polyethylene, polyethylene wax or paraffin wax having a softening point of 60° C to 130° C to the non-aqueous dispersion. The present invention is based on this finding.

It is an object of the present invention to provide a non-aqueous dispersion containing a graft copolymer, having high dispersability and stability.

SUMMARY OF THE INVENTION

The present invention relates to a non-aqueous dispersion containing a graft copolymer and at least one substance selected from the group consisting of polyethylene, polyethylene wax and paraffin wax, in a liquid carrier (an organic solvent) having a high resistivity and a low dielectric constant and a process of preparing said non-aqueous dispersion.

The non-aqueous dispersion of the present invention is prepared by carrying out successively the following three steps (a), (b) and (c) in a liquid carrier such as an aliphatic hydrocarbon or a halogenated aliphatic hydrocarbon at an elevated temperature, adding polyethylene, polyethylene wax or paraffin wax having a softening point of 60° C to 130° C in one of the three steps and then cooling the reaction product with vigorous stirring:

a. copolymerizing a monomer having the general formula (I):

(wherein R is hydrogen or methyl, and A is $-COOC_nH_{2n+1}$ or $-OC_nH_{2n+1}$, n being an integer of 6 to 20) with at least one compound selected from the group consisting of acrylic acid, methacrylic acid, fumaric acid, crotonic acid, itaconic acid, maleic acid, glycidyl acrylate and glycidyl methacrylate, b. esterfying the copolymer obtained in step (a) with glycidyl acrylate or glycidyl methacrylate when said copolymer has been prepared by using acrylic acid, methacrylic acid, fumaric acid, crotonic acid, itaconic acid or maleic acid, or esterifying the copolymer obtained above in step (a) with acrylic acid, methacrylic acid, fumaric acid, crotonic acid, itaconic acid or maleic acid when said copolymer has been prepared by using glycidyl acrylate or glycidyl methacrylate, and then c. grafting the esterified copolymer obtained above in step (b) with a monomer having a vinyl group selected from the group consisting of acrylic acid, methacrylic acid, a lower alkyl ester of acrylic acid or methacrylic acid, styrene, methylstyrene and vinyl acetate.

The process of preparing a non-aqueous dispersion of this invention will be illustrated in detail below.

The reaction of the step (a) is carried out by heating a mixture of a monomer of the formula (I) and one compound selected from the group consisting of acrylic acid, methacrylic acid, fumaric acid, crotonic acid, itaconic acid, maleic acid, glycidyl acrylate and glycidyl methacrylate in a ratio of 99.9–80 to 0.1–20 parts by weight at a temperature of 70° C to 150° C in an aliphatic hydrocarbon. Typical monomers of the formula (I) include lauryl, 2-ethylhexyl, stearyl or vinylstearyl acrylates or methacrylates.

The reaction of the step (b) is carried out by adding a monomer as mentioned above to the reaction mixture obtained in the step (a) and heating the mixture at a temperature of 30° C to 120° C in the presence of a catalyst such as pyridine or lauryldimethylamine. Said monomer is used in an amount of 0.1–20 parts based on 100 parts by weight of the copolymer obtained in the step (a).

The reaction of the step (c) is carried out by adding a monomer as mentioned above to the reaction mixture obtained in the step (b) and heating the mixture at a temperature of 70° C to 150° C in the presence of a catalyst such as benzoyl peroxide or 2,2'-azobisisobutyronitrile. Said monomer is used in an amount of 5–100 parts based on 100 parts by weight of the esterified copolymer obtained in the step (b). The lower alkyl ester of acrylic acid or methacrylic acid used in this step (c) is methyl, ethyl, propyl or butyl acrylate or methacrylate.

In the way mentioned above, a mixture containing graft copolymers can be obtained.

In one of the three steps (a), (b) and (c), a solution of polyethylene, polyethylene wax or paraffin wax in an organic solvent is added to the reaction mixture.

Polyethylene, polyethylene wax and paraffin wax having a softening point of 60° C to 130° C are used in an amount of 1–50 parts based on 100 parts by weight of the graft copolymer. Preferred organic solvents for dissolving polyethylene, polyethylene wax or paraffin wax are as follows.

Aliphatic hydrocarbons such as n-pentane, n-hexane and isooctane, aliphatic hydrocarbons sold by Esso-Standard Oil Co. under the trademark of Isopar H, G, L or K, carbon tetrachloride and tetrachloroethylene.

Polyethylene, polyethylene wax and paraffin wax having a softening point of 60° C to 130° C are commercially available. Manufacturers, trademarks and softening points are listed below:

| Manufacturer | Trademark | Softening point (° C) |
|---|---|---|
| (1) polyethylene | | |
| Union Carbide Corp. | DYNF | 102 |
| | DYNH | 102 |
| | DYNI | 102 |
| | DYNJ | 102 |
| | DYNK | 102 |
| Du Pont Co. Inc. | Alathon-3 | 103 |
| | Alathon-10 | 96 |
| | Alathon-12 | 84 |
| | Alathon-14 | 80 |
| | Alathon-16 | 95 |
| | Alathon-20 | 86 |
| | Alathon-22 | 84 |
| | Alathon-25 | 96 |
| Monsanto Co. | Orizon-806 | 116 |
| | Orizon-705 | 116 |
| | Orizon-50 | 126 |
| Philips Electronics Industrial Corp. | Marlex 1005 | 92 |
| (2) Polyethylene wax | | |
| Sanyo Kasei Kagaku- | Sanwax-131P | 108 |

| Manufacturer | Trademark | Softening point (° C) |
|---|---|---|
| kogyo K.K. | | |
| | Sanwax-151P | 107 |
| | Sanwax-161P | 111 |
| | Sanwax-165P | 107 |
| | Sanwax-171P | 105 |
| | Sanwax-E200 | 95 |
| (3) Paraffin wax | | |
| Junsei Yakuhin K.K. | Paraffin Wax | 60–95 |

By cooling the reaction mixture containing the graft-copolymer and at least one substance selected from the group consisting of polyethylene, polyethylene wax and paraffin wax, said reaction mixture having a temperature of 70° C to 150° C, to room temperature with vigorous stirring, a non-aqueous dispersion of the present invention can be obtained.

In the process of this invention, fine particles of polyethylene, polyethylene wax or paraffin wax can be formed by cooling said reaction mixture. In this case, smaller particle sizes (of 0.1 to 0.5 micron) can be obtained by cooling quickly the dilute (1 to 20%) reaction mixture, and larger particle sizes (of 0.5 to 20 micron) can be obtained by cooling slowly the concentrated (20 to 50%) reaction mixture.

The process of this invention is simple, and the obtained non-aqueous dispersion has high dispersability and stability.

Non-aqueous dispersions of this invention are useful as a binder of paint or varnish (coating material), a binder for forming a recording layer of electrostatographic material, or a liquid dispersion medium for preparing a liquid developer for electrostatic latent image.

The following examples are given to illustrate preferred embodiments of processes for preparing the non-aqueous dispersion of this invention. It will be understood this invention is not limited to these examples.

EXAMPLE 1

In a vessel equipped with a thermometer, a stirrer and a reflux condenser, 300g of Isopar H was heated to a temperature of 95° C. To this heated Isopar H was added dropwise with stirring over about 3 hours a mixture of 200g of 2-ethylhexyl methacrylate, 10g of glycidyl methacrylate and 3g of 2,2′-azobisisobutyronitrile, and then the stirring was continued for about one hour at a temperature of 95° C to produce a copolymer. To this reaction mixture was added a mixture of 5g of acrylic acid, 0.1g of hydroquinone and 1g of lauryldimethylamine, and the reaction mixture was stirred for about 15 hours at a temperature of 90° C to esterify the copolymer. The degree of esterification was about 30%. To the reaction mixture thus esterified was added 500g of Isopar G, and then a mixture of 50g of methyl methacrylate and 3g of 2,2′-azobisisobutyronitrile was added dropwise with stirring over about 3 hours at a temperature of 90° C, and further this mixture was stirred for about 5 hours at a temperature of 90° C to produce a graft copolymer. To 300g of the reaction mixture thus obtained was added 300g of Isopar G, and then the mixture was heated to a temperature of 90° C and 50g of polyethylene (trademark; Orizon 50) was added. The mixture was heated for about one hour at a temperature of 90° C with stirring to obtain a clear liquid. This clear liquid was cooled with cold water, with vigorous stirring, to prepare a non-aqueous dispersion of this invention. The solid content of the dispersion was 17.4%.

EXAMPLE 2

In a vessel similar to that used in Example 1, 400g of isooctane was heated to a temperature of 95° C. To this heated isooctane was added dropwise with stirring over about one hour a mixture of 200g of stearyl methacrylate, 10g of glycidyl acrylate and 2g of benzoyl peroxide, and then the stirring was continued for about 3 hours at a temperature of 95° C to produce a copolymer. To this reaction mixture was added a mixture of 1g of lauryldimethylamine, 3g of methacrylic acid and 0.1g of hydroquinone, and the reaction mixture was stirred for about 10 hours at a temperature of 95° C to esterify the copolymer. The degree of esterification was about 30%. To this reaction mixture thus esterified was added 600g of isooctane, and then a mixture of 60g of styrene and 4g of benzoyl peroxide was added dropwise with stirring over about 3 hours at a temperature of 95° C and further this mixture was stirred for about 5 hours at a temperature of 95° C to produce a graft copolymer. To 200g of this reaction mixture was added 200g of isooctane, and then the mixture was heated to a temperature of 95° C and 50g of polyethylene (trademark; DYNI) was added. The mixture was heated for about 40 minutes at a temperature of 95° C with stirring to obtain a clear liquid. This clear liquid was cooled by the same manner as that in Example 1 to prepare a non-aqueous dispersion of this invention. The solid content of the dispersion was 18.8%.

EXAMPLE 3

In a vessel similar to that used in Example 1, 400g of Isopar L was heated to a temperature of 90° C. To this heated Isopar L was added dropwise with stirring over about 2 hours a mixture of 200g of lauryl methacrylate, 3g of crotonic acid and 1g of benzoyl peroxide, and then the stirring was continued for about 3 hours at a temperature of 95° C to produce a copolymer. To this reaction mixture was added a mixture of 1g of lauryldimethylamine and 10g of glycidyl methacrylate, and the reaction mixture was stirred for about 20 hours at a temperature of 90° C to esterify the copolymer. The degree of esterification was about 50%. To this reaction mixture was added 600g of Isopar L, and then a mixture of 40g of ethyl acrylate and 4g of benzoyl peroxide was added dropwise with stirring over about 3 hours at a temperature of 90° C and further this mixture was stirred for about 5 hours at a temperature of 90° C to produce a graft copolymer. To 200g of this reaction mixture was added 200g of Isopar L, and then the mixture was heated to a temperature of 90° C and 20g of polyethylene (trademark; DYNH) was added. The mixture was heated for about one hour at a temperature of 95° C with stirring to obtain a clear liquid. This clear liquid was cooled by the same manner as that in Example 1 to prepare a non-aqueous dispersion of this invention. The solid content of the dispersion was 12.3%.

EXAMPLE 4

In a vessel similar to that used in Example 1, 400g of Isopar H was heated to a temperature of 85° C. To this heated Isopar H was added dropwise with stirring over 2 hours a mixture of 200g of 2-ethylhexyl methacrylate, 5g of methacrylic acid and 3g of 2,2'-azobisisobutyronitrile, and then the stirring was continued for about 2 hours at a temperature of 85° C to produce a copolymer. To this reaction mixture was added a mixture of 1g of lauryldimethylamine and 5g of glycidyl acrylate, and the reaction mixture was stirred for about 18 hours at a temperature of 85° C to esterify the copolymer. A degree of esterification was about 50%. To this reaction mixture was added 400g of Isopar H, and then a mixture of 30g of vinyl acetate and 3g of 2,2'-azobisisobutyronitrile was added dropwise with stirring over about 3 hours at a temperature of 90° C and further this mixture was stirred for about 5 hours at a temperature of 90° C to produce a graft copolymer. To 200g of this reaction mixture was added 200g of Isopar H, and then the mixture was heated to a temperature of 85° C and 20g of polyethylene (trademark; Alathon) was added. The mixture was heated for about one hour at a temperature of 85° C with stirring to obtain a clear liquid. This clear liquid was cooled by the same manner as that in Example 1 to prepare a non-aqueous dispersion of this invention. The solid content of the dispersion was 13.7%.

EXAMPLE 5

In a vessel similar to that used in Example 1, 300g of isooctane was heated to a temperature of 90° C. To this heated Isopar H was added dropwise with stirring over 2 hours a mixture of 200g of 2-ethylhexyl methacrylate, 10g of glycidyl methacrylate and 2g of benzoyl peroxide, and then the stirring was continued for about 3 hours at a temperature of 90° C to produce a copolymer. The copolymer was contained in an amount of 40.2% by weight in the reaction mixture. To this reaction mixture was added a mixture of 1g of lauryldimethylamine, 3g of maleic acid and 0.05g of hydroquinone, and the reaction mixture was stirred for about 15 hours at a temperature of 90° C to esterify the copolymer. Acid value of this reaction product was 2.0. To this reaction mixture was added 520g of isooctane, and then a mixture of 40g of methylstyrene and 3g of benzoyl peroxide was added dropwise with stirring over about 3 hours at a temperature of 90° C and further this mixture was stirred for about 5 hours at a temperature of 90° C to produce a graft copolymer. To 200g of this reaction mixture was added 200g of isooctane, and then the mixture was heated to a temperature of 90° C and 100g of polyethylene wax (trademark; Sanwax 131P) was added. The mixture was heated for about one hour at a temperature of 90° C with stirring to obtain a clear liquid. This clear liquid was cooled by the same manner as that in Example 1 to prepare a non-aqueous dispersion of this invention. The solid content of the dispersion was 27.6%.

EXAMPLE 6

In a vessel similar to that used in Example 1, a mixture of 300g of Isopar H and 50g of polyethylene wax (trademark; Sanwax 171P) was heated to a temperature of 90° C. To this heated mixture was added dropwise with stirring over 5 hours a mixture of 200g of stearyl acrylate, 20g of glycidyl methacrylate and 3g of 2,2'-azobisisobutyronitrile, and then the stirring was continued for about 3 hours at a temperature of 90° C to produce a copolymer. To this reaction mixture was added a mixture of 10g of acrylic acid, 1g of lauryldimethylamine and 0.5g of hydroquinone, and the reaction mixture was stirred for about 10 hours at a temperature of 95° C to esterify the copolymer. To this reaction mixture was added 300g of Isopar H, and then a mixture of 40g of styrene monomer and 3g of 2,2'-azobisisobutyronitrile was added dropwise with stirring over about 3 hours at a temperature of 95° C and further this mixture was stirred for about 5 hours at a temperature of 95° C to produce a graft copolymer. To 150g of this reaction mixture was added 200g of Isopar H, and then the mixture was heated for about one hour at a temperature of 90° C with stirring to obtain a clear liquid. This clear liquid was cooled by the same manner as that in Example 1 to prepare a non-aqueous dispersion of this invention. The solid content of the dispersion was 14.5%.

EXAMPLE 7

A non-aqueous dispersion of this invention was obtained by repeating the same procedure as that of Example 6 except that paraffin wax (trademark; Paraffin Wax, softening point 70° C–72° C) was used instead of polyethylene wax. The solid content of the dispersion was 13.5%.

We claim:

1. A non-aqueous dispersion containing a graft copolymer and from one to 50 parts by weight, based on the weight of said graft copolymer, of at least one substance selected from the group consisting of polyethylene, polyethylene wax and paraffin wax having a softening point of 60° C to 130° C, in an organic liquid carrier having a high resistivity and a low dielectric constant, which non-aqueous dispersion has been prepared by carrying out successively the following three steps (a), (b) and (c) in said liquid carrier at an elevated temperature, adding said substance in one of the three steps and then cooling the reaction product of step (c) with vigorous stirring:

a. copolymerizing from 99.9 to 80 parts by weight of a monomer having the formula (I):

, wherein R is hydrogen or methyl, A is $-COOC_nH_{2n+1}$ or $-OC_nH_{2n+1}$, and $n$ is an integer of 6 to 20, with from 0.1 to 20 parts by weight of at least one compound selected from the group consisting of acrylic acid, methacrylic acid, fumaric acid, crotonic acid, itaconic acid, maleic acid, glycidyl acrylate and glycidyl methacrylate, b. esterifying 100 parts by weight of the copolymer obtained in step (a) with from 0.1 to 20 parts by weight of glycidyl acrylate or glycidyl methacrylate when said copolymer has been prepared by using acrylic acid, methacrylic acid, fumaric acid, crotonic acid, itaconic acid or maleic acid, or esterifying 100 parts by weight of the copolymer obtained in step (a) with from 0.1 to 20 parts by weight of acrylic acid, methacrylic acid, fumaric acid, crotonic acid, itaconic acid or maleic acid when said copolymer has been prepared by using glycidyl acrylate or glycidyl methacrylate, and then c. grafting 100 parts by weight of the esterified copolymer obtained in step (b) with from 5 to 100 parts by weight of a monomer having a vinyl group selected from the group consisting of acrylic acid, methacrylic acid, a lower alkyl ester of acrylic acid or methacrylic acid, styrene, methylstyrene and vinyl acetate.

2. A process of preparing a non-aqueous dispersion containing a graft copolymer comprising carrying out successively the following three steps (a), (b) and (c) in an organic liquid carrier having a high resistivity and a low dielectric constant, at an elevated temperature, adding from one to 50 parts by weight, per 100 parts by weight of the graft copolymer, of at least one substance selected from the group consisting of polyethylene, polyethylene wax or paraffin wax having a softening point of 60° C to 130° C in one of the three steps and then cooling the reaction product of step (c) with vigorous stirring:

a. copolymerizing from 99.9 to 80 parts by weight of a monomer having the formula (I):

, wherein R is hydrogen or methyl, A is $-COOC_nH_{2n+1}$ or $-OC_nH_{2n+1}$, and $n$ is an integer of 6 to 20, with from 0.1 to 20 parts by weight of at least one compound selected from the group consisting of acrylic acid, methacrylic acid, fumaric acid, crotonic acid, itaconic acid, maleic acid, glycidyl acrylate and glycidyl methacrylate, b. esterifying 100 parts by weight of the copolymer obtained in step (a) with from 0.1 to 20 parts by weight of glycidyl acrylate or glycidyl methacrylate when said copolymer has been prepared by using acrylic acid, methacrylic acid, fumaric acid, crotonic acid, itaconic acid or maleic acid, or esterifying 100 parts by weight of the copolymer obtained in step (a) with from 0.1 to 20 parts by weight of acrylic acid, methacrylic acid, furmaric acid, crotonic acid, itaconic acid or maleic acid when said copolymer has been prepared by using glycidyl acrylate or glycidyl methacrylate, and then c. grafting 100 parts by weight of the esterified copolymer obtained in step (b) with from 5 to 100 parts by weight of a monomer having a vinyl group selected from the group consisting of acrylic acid, methacrylic acid, a lower alkyl ester of acrylic acid or methacrylic acid, styrene, methylstyrene and vinyl acetate.

3. A non-aqueous dispersion as claimed in claim 1, in which said liquid carrier is an aliphatic hydrocarbon or a halogenated aliphatic hydrocarbon.

4. A process as claimed in claim 2, in which said liquid carrier is an aliphatic hydrocarbon or a halogenated aliphatic hydrocarbon.

* * * * *